United States Patent
Nakazawa et al.

(10) Patent No.: US 11,559,861 B2
(45) Date of Patent: Jan. 24, 2023

(54) METHOD FOR USING SHEET SHAPED MEMBER

(71) Applicant: DAIKIN INDUSTRIES, LTD., Osaka (JP)

(72) Inventors: Takema Nakazawa, Osaka (JP); Masaya Kasai, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/521,288

(22) Filed: Nov. 8, 2021

(65) Prior Publication Data

US 2022/0055160 A1 Feb. 24, 2022

Related U.S. Application Data

(63) Continuation of application No. PCT/JP2020/017122, filed on Apr. 21, 2020.

(30) Foreign Application Priority Data

May 9, 2019 (JP) .............................. JP2019-088842

(51) Int. Cl.
*B23P 15/26* (2006.01)

(52) U.S. Cl.
CPC ........... *B23P 15/26* (2013.01); *B23P 2700/09* (2013.01)

(58) Field of Classification Search
CPC ... B23P 15/26; B23P 2700/09; F28F 2245/02; F28F 2245/04; F28F 13/18; F28D 9/0062; F28D 21/0014; F28D 21/0015; F24F 2003/1435; F24F 12/006
See application file for complete search history.

(56) References Cited

U.S. PATENT DOCUMENTS

| | | | |
|---|---|---|---|
| 6,536,514 B1 | 3/2003 | Sugiyama et al. | |
| 2012/0205081 A1* | 8/2012 | Terai | F28D 9/0025 156/60 |
| 2017/0045257 A1* | 2/2017 | Moffitt | F28F 19/006 |

FOREIGN PATENT DOCUMENTS

| | | | |
|---|---|---|---|
| JP | 2001-27489 A | 1/2001 | |
| JP | 5230821 B2 | 3/2013 | |

OTHER PUBLICATIONS

International Preliminary Report of corresponding PCT Application No. PCT/JP2020/017122 dated Nov. 18, 2021.
International Search Report of corresponding PCT Application No. PCT/JP2020/017122 dated Jul. 7, 2020.

* cited by examiner

*Primary Examiner* — Lee A Holly
(74) *Attorney, Agent, or Firm* — Global IP Counselors, LLP

(57) ABSTRACT

A method uses a sheet shaped member to separate two spaces from each other. The sheet shaped member includes a base having a first principal surface and a second principal surface, and a moisture permeable membrane provided on or close to the first principal surface of the base. The first principal surface of the base is arranged in one of the two spaces having a lower water vapor pressure when the two spaces separated from each other by the sheet-like member have different water vapor pressures.

2 Claims, 4 Drawing Sheets

METHOD FOR USING SHEET SHAPED MEMBER

CROSS-REFERENCE TO RELATED APPLICATIONS

This is a continuation of International Application No. PCT/JP2020/017122 filed on Apr. 21, 2020, which claims priority to Japanese Patent Application No. 2019-088842, filed on May 9, 2019. The entire disclosures of these applications are incorporated by reference herein.

BACKGROUND

Field of Invention

The present disclosure relates to a method of using a sheet-like member.

Background Information

A total heat exchange element including partition plates made of sheet-like members each having a base layer and a moisture permeable membrane layer provided on the base layer has been known (see, e.g., Japanese Patent No. 5230821). This total heat exchange element having the partition plate including the base layer and the moisture permeable membrane layer solves a problem of condensed water that drips when the element is used in a high-humidity environment.

This type of screw compressor further includes an electric motor rotating the screw rotor at a fixed rotational speed. The capacity (displacement per unit time) of this type of screw compressor is controlled by unloading such that a portion of a working fluid (a refrigerant) that is being compressed is returned to the suction side of the screw compressor.

SUMMARY

A first aspect of the present disclosure is directed to a method that uses a sheet shaped member to separate two spaces from each other. The sheet shaped member includes a base having a first principal surface and a second principal surface, and a moisture permeable membrane provided on or close to the first principal surface of the base. The first principal surface of the base is arranged in one of the two spaces having a lower water vapor pressure when the two spaces separated from each other by the sheet-like member have different water vapor pressures.

DETAILED DESCRIPTION OF EMBODIMENT(S)

A total heat exchange element (30) according to an embodiment will be described below.

Ventilation Device

The total heat exchange element (30) according to this embodiment is provided for a ventilation device (10). The ventilation device (10) including the total heat exchange element (30) will be described below.

Figure 1:
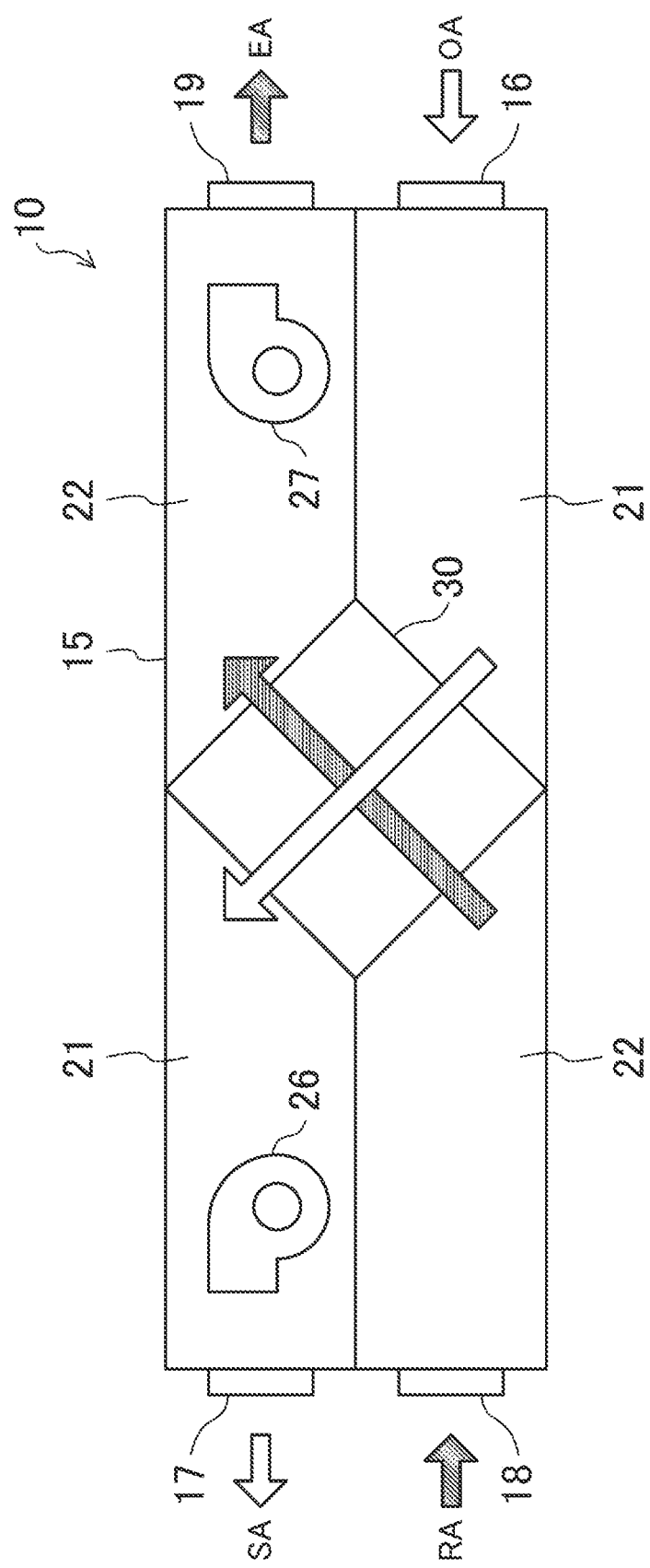
FIG. 1 is a schematic diagram illustrating a ventilation device including a total heat exchange element according to an embodiment.

As illustrated in FIG. 1, the ventilation device (10) includes a casing (15) that houses the total heat exchange element (30). The casing (15) includes an outdoor air inlet (16), an air supply port (17), an indoor air inlet (18), and an exhaust port (19). An air supply passage (21) and an exhaust passage (22) are formed in an internal space of the casing (15). The air supply passage (21) has an end connected to the outdoor air inlet (16). The other end of the air supply passage (21) is connected to the air supply port (17). The exhaust passage (22) has an end connected to the indoor air inlet (18). The other end of the exhaust passage (22) is connected to the exhaust port (19).

The total heat exchange element (30) is arranged to cross the air supply passage (21) and the exhaust passage (22). The total heat exchange element (30) is disposed in the casing (15) such that first air flow paths (36) to be described later communicate with the air supply passage (21), and second air flow paths (37) to be described later communicate with the exhaust passage (22). The total heat exchange element (30) will be described in detail later.

The ventilation device (10) further includes an air supply fan (26) and an exhaust fan (27). The air supply fan (26) is disposed downstream of the total heat exchange element (30) in the air supply passage (21) (i.e., near the air supply port (17)). The exhaust fan (27) is disposed downstream of the total heat exchange element (30) in the exhaust passage (22) (i.e., near the exhaust port (19)).

In the ventilation device (10), outdoor air flows through the air supply passage (21) toward the inside of the room, and indoor air flows through the exhaust passage (22) toward the outside of the room. The total heat exchange element (30) exchanges sensible heat and moisture (latent heat) between the outdoor air flowing through the air supply passage (21) and the indoor air flowing through the exhaust passage (22).

Total Heat Exchange Element

Figure 2:
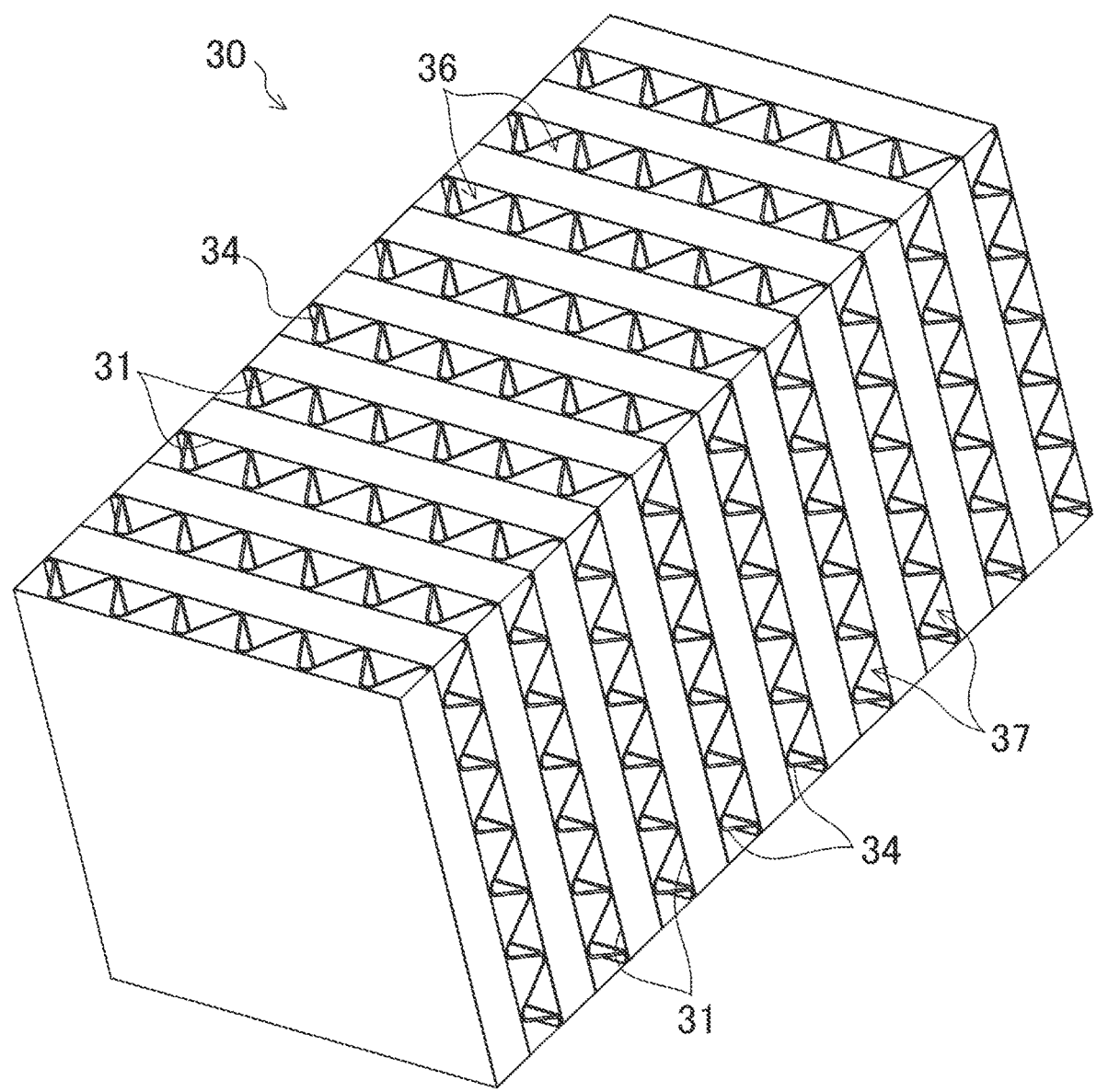
FIG. 2 is a schematic perspective view illustrating the total heat exchange element according to the embodiment.
Figure 3:
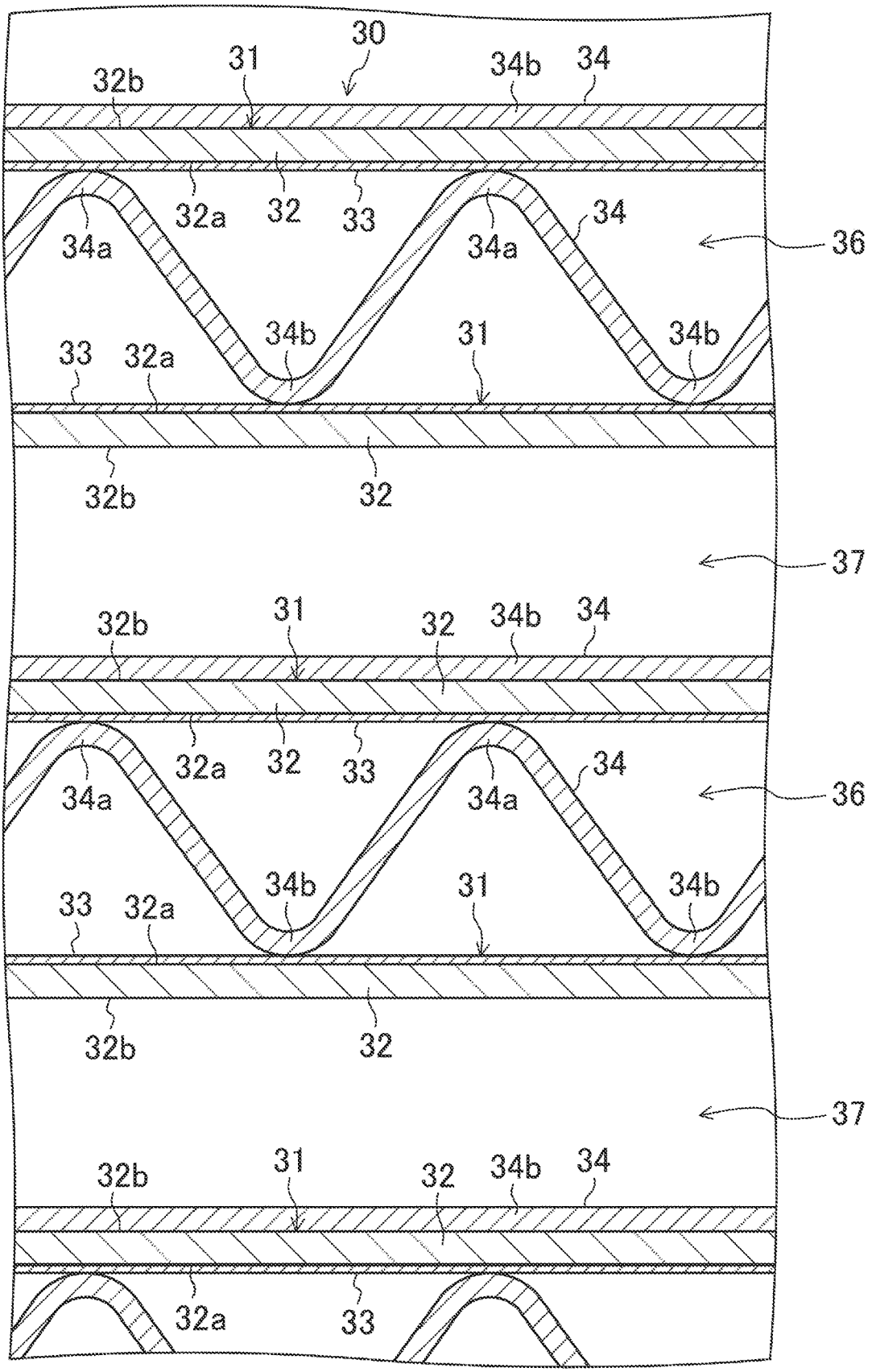
FIG. 3 is a cross-sectional view illustrating an essential portion of the total heat exchange element according to the embodiment.

As illustrated in FIGS. 2 and 3, the total heat exchange element (30) is a cross-flow heat exchanger having the first air flow paths (36) and the second air flow paths (37). The total heat exchange element (30) includes a plurality of partition plates (31) and a plurality of spacing members (34) which are alternately stacked to form a quadrangular prism as a whole. In the total heat exchange element (30), a distance between each adjacent pair of the partition plates (31) is substantially kept constant by an associated one of the spacing members (34).

The partition plates (31) are configured as flat sheet shaped (sheet-like) members that are generally square in plan view. Each of the partition plates (31) has a porous base (32) and a moisture permeable membrane (33). The partition plate (31) has a thickness of 30 μm or less, but is not limited to have this thickness.

The porous base (32) is a plate-shaped member having a first principal surface (32a) and a second principal surface (32b). The material of the porous base (32) is, for example, a nonwoven fabric of resin, metal, glass, or pulp, or a film of resin or metal. The porous base (32) has a thickness of several tens of μm, but is not limited to have this thickness. The porous base (32) is permeable to moisture. The porous base (32) constitutes a base.

The moisture permeable membrane (33) is a sheet-like member provided on the first principal surface (32a) of the porous base (32). The moisture permeable membrane (33) covers the first principal surface (32a) of the porous base (32). No moisture permeable membrane (33) is provided on the second principal surface (32b) of the porous base (32). The moisture permeable membrane (33) is made of a polymer material containing a hydrophilic group and a hydrophobic group, e.g., polyurethane. The moisture permeable membrane (33) has a thickness of 1 μm or less, but is not limited to have this thickness. The moisture permeable membrane (33) is permeable to moisture.

The spacing members (34) are configured as corrugated plate-shaped members that are generally square in plan view. Each of the spacing members (34) has a plurality of ridges (34a) each having linear ridge lines, and a plurality of valleys (34b) each having linear bottom lines. The ridge lines of the ridges (34a) and the bottom lines of the valleys (34b) are substantially parallel to each other. Each of the spacing members (34) has the ridges (34a) and the valleys (34b) alternately formed. Each of the spacing members (34) maintains the distance between the partition plates (31) arranged on both sides of the spacing member (34).

In the total heat exchange element (30), the first air flow paths (36) and the second air flow paths (37) are alternately formed in the stacking direction of the partition plates (31) and the spacing members (34), i.e., the direction of the center axis of the total heat exchange element (30). Each of the partition plates (31) separates an adjacent pair of the first air flow path (36) and the second air flow path (37) from each other. The first air flow paths (36) and the second air flow paths (37) constitute two different spaces.

In the total heat exchange element (30), adjacent ones of the spacing members (34) with an associated one of the partition plates (31) interposed therebetween are arranged such that the direction of the ridge lines of one of the spacing members (34) are substantially orthogonal to the direction of the ridge lines of the other spacing member (34). This arrangement provides the total heat exchange element (30) with the first air flow paths (36) that open in a pair of opposed side surfaces of the total heat exchange element (30), and the second air flow paths (37) that open in the other pair of opposed side surfaces.

As illustrated in FIG. 3, each of the partition plates (31) has the first principal surface (32a) provided with the moisture permeable membrane (33) arranged in the corresponding first air flow path (36). In other words, each of the partition plates (31) has the second principal surface (32b) provided with no moisture permeable membrane (33) arranged in the corresponding second air flow path (37). The partition plates (31) adjacent to each other across the first air flow path (36) have the first principal surfaces (32a) facing each other. The partition plates (31) adjacent to each other across the second air flow path (37) have the second principal surfaces (32b) facing each other.

Arrangement of Total Heat Exchange Element

For example, consider a state in which the outdoor air has a lower water vapor pressure than the indoor air, like in summer. In such a state, the total heat exchange element (30) is arranged such that the second air flow paths (37) communicate with the air supply passage (21), and the first air flow paths (36) communicate with the exhaust passage (22). Thus, the second principal surface (32b) of the porous base (32) is arranged to face the second air flow path (37) communicating with the air supply passage (21) through which the outdoor air having a higher water vapor pressure than the air in the exhaust passage (22) flows, and the first principal surface (32a) of the porous base (32) is arranged to face the first air flow path (36) communicating with the exhaust passage (22) through which the indoor air having a lower water vapor pressure than the air in the air supply passage (21) flows.

Then, consider a state in which the indoor air has a lower water vapor pressure than the outdoor air, like in winter, for example. In such a state, the total heat exchange element (30) is arranged such that the first air flow paths (36) communicate with the air supply passage (21) and the second air flow paths (37) communicate with the exhaust passage (22). Thus, the first principal surface (32a) of the porous base (32) faces the first air flow path (36) communicating with the air supply passage (21) through which the outdoor air having a lower water vapor pressure than the air in the exhaust passage (22) flows, and the second principal surface (32b) of the porous base (32) faces the second air flow path (37) communicating with the exhaust passage (22) through which the indoor air having a higher water vapor pressure than the air in the air supply passage (21) flows.

Advantages of Embodiment

The method of using the partition plate (31) of the present embodiment includes using the partition plate (31) separating two spaces (36, 37) from each other, the partition plate (31) including: a porous base (32) having a first principal surface (32a) and a second principal surface (32b); and a moisture permeable membrane (33) provided on or close to the first principal surface (32a) of the base (32), the first principal surface (32a) of the base (32) being arranged in one of the two spaces (36, 37) having a lower water vapor pressure when the two spaces (36, 37) separated from each other by the sheet-like member (31) have different water vapor pressures. The above findings are applied to this method. In this method, the partition plate (31) separating the two spaces (36, 37) from each other is used with the first principal surface (32a) of the porous base (32) arranged in one of the two spaces (36, 37) having a lower water vapor pressure than the other. This can maximize the amount of moisture moving through the partition plate (31) having the porous base (32) and the moisture permeable membrane (33), and thus, the partition plate (31) can be effectively used.

According to the method of using the partition plate (31) of the present embodiment, the moisture permeable membrane (33) is provided on the first principal surface (32a) of the porous base (32). Thus, the partition plate (31) having the porous base (32) and the moisture permeable membrane (33) can be easily manufactured.

OTHER EMBODIMENTS

The foregoing embodiment may also be configured as follows.

Figure 4:
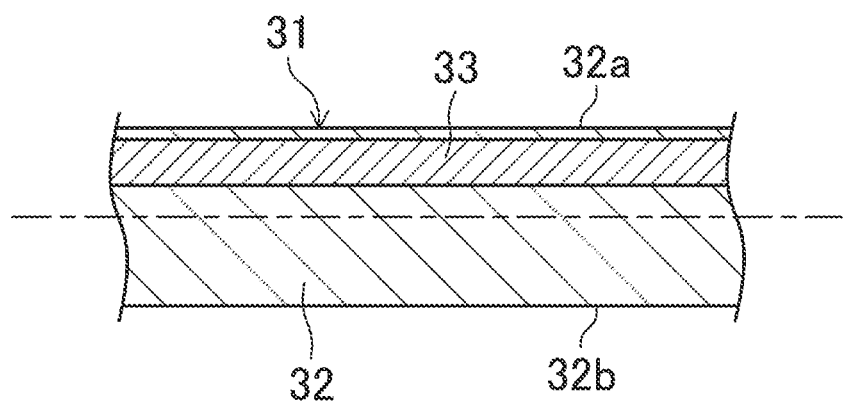
FIG. 4 is a cross-sectional view illustrating an essential portion of a total heat exchange element according to another embodiment.

For example, as illustrated in FIG. 4, the moisture permeable membrane (33) may be provided in the porous base (32). In this example, the moisture permeable membrane

(33) is provided in the porous base (32) near the first principal surface (32a). Specifically, the moisture permeable membrane (33) is provided in the porous base (32) to be located closer to the first principal surface (32a) than an intermediate plane indicated by a dot-dash line in FIG. 4 between the first principal surface (32a) and the second principal surface (32b).

For example, in the total heat exchange element (30), the first principal surface (32a) of the porous base (32) of each of the partition plates (31) may not be arranged in the first air flow path (36). In other words, the use method of the present disclosure can be applied to only some of the plurality of partition plates (31) of the total heat exchange element (30).

For example, the total heat exchange element (30) may be an optional total heat exchange element other than the cross-flow total heat exchange element, such as a counter-flow total heat exchange element.

While the embodiment and the variations thereof have been described above, it will be understood that various changes in form and details may be made without departing from the spirit and scope of the claims. The foregoing embodiment and the variations thereof may be combined and replaced with each other without deteriorating the intended functions of the present disclosure.

As can be seen from the foregoing description, the present disclosure is useful for a method of using a sheet-like member.

The invention claimed is:

1. A method of using a sheet shaped member separating two spaces from each other, the sheet shaped member including a base having a first principal surface and a second principal surface, and a moisture permeable membrane provided closer to the first principal surface of the base than to the second, principal surface, the method comprising:
arranging the first principal surface of the base in one of the two spaces having a lower water vapor pressure when the two spaces separated from each other by the sheet shaped member have different water vapor pressures.

2. A method of using a sheet shaped member separating two spaces from each other, the sheet shaped member including a base having a first principal surface and a second principal surface, and a moisture permeable membrane provided on the first principal surface of the base, the method comprising:
arranging the first principal surface of the base in one of the two spaces having a lower water vapor pressure when the two spaces separated from each other by the sheet shaped member have different water vapor pressures.

* * * * *